(12) United States Patent
George et al.

(10) Patent No.: US 7,938,453 B2
(45) Date of Patent: May 10, 2011

(54) STABILIZED CONNECTOR

(75) Inventors: John Anthony George, Cincinnati, OH (US); Stephen Phillip Frank, Loveland, OH (US)

(73) Assignee: Richards Industries, LLC, Cincinnati, OH (US)

( * ) Notice: Subject to any disclaimer, the term of this patent is extended or adjusted under 35 U.S.C. 154(b) by 231 days.

(21) Appl. No.: 12/380,032

(22) Filed: Feb. 23, 2009

(65) Prior Publication Data

US 2009/0211053 A1 Aug. 27, 2009

Related U.S. Application Data

(60) Provisional application No. 61/067,338, filed on Feb. 27, 2008.

(51) Int. Cl.
*F16L 15/00* (2006.01)
(52) U.S. Cl. .................... 285/219; 285/143.1
(58) Field of Classification Search .............. 285/219, 285/220, 221, 390, 143.1, 114, 142.1, 355
See application file for complete search history.

(56) References Cited

U.S. PATENT DOCUMENTS

| | | | |
|---|---|---|---|
| 788,172 A | 4/1905 | Seiler | |
| 1,201,746 A | 10/1916 | Lavercombe | |
| 1,812,794 A | 6/1931 | Lally | |
| 2,238,169 A | 4/1941 | Heyn et al. | |
| 2,449,588 A | 9/1948 | Clafford | |
| 2,465,495 A | 3/1949 | Taliento | |
| 2,679,411 A | 5/1954 | Moore | |
| 2,704,676 A * | 3/1955 | Harding | 285/220 |
| 3,362,731 A | 1/1968 | Gasche et al. | |
| 3,625,065 A | 12/1971 | Thompson | |
| 3,817,283 A | 6/1974 | Hewson | |
| 4,129,149 A | 12/1978 | Brehmer et al. | |
| 4,151,745 A | 5/1979 | Cordy et al. | |
| 4,193,420 A | 3/1980 | Hewson | |
| 4,467,864 A | 8/1984 | Crist | |
| 4,553,776 A * | 11/1985 | Dodd | 285/220 |
| 4,570,322 A * | 2/1986 | Dence | 285/220 |
| 4,582,089 A | 4/1986 | Nimberger | |
| 4,618,314 A | 10/1986 | Hailey | |

(Continued)

FOREIGN PATENT DOCUMENTS

EP 0 522 708 A2 1/1993

(Continued)

OTHER PUBLICATIONS

Century Valve, Custody Transfer—Gas Measurement (pipeline) Close Coupled Manifold Systems, Global Instrumentation Pressure Management Solutions, Jan. 2000, 11 pgs., Century Valve Brochure, 1915—30th Avenue, NE, Calgary, Alberta, Canada.

PGI International, Direct Mount Systems For The Gas Industry, 2003. 32. pages, Catalog DMS 3-03. PGI International. 16101 Vallen Drive, Houston, Tex., USA.

(Continued)

*Primary Examiner* — David E Bochna
(74) *Attorney, Agent, or Firm* — Taft Stettinius & Hollister LLP (57) ABSTRACT

Tap mounting assemblies for reducing loads on the threaded end portions of a tap. Some exemplary embodiments employ a spring such as Belleville washers to bias apart the tap and a mounting plate, and some embodiments provide visual indication of proper tightening. Some exemplary embodiments allow angular adjustment of a portion of the tap assembly without disturbing the tapered thread engagement of the tap on the mounting surface. Exemplary embodiments may employ a base plate between a jack screw and a mounting surface.

27 Claims, 9 Drawing Sheets

U.S. PATENT DOCUMENTS

| | | | |
|---|---|---|---|
| 4,672,728 | A | 6/1987 | Nimberger |
| 4,920,626 | A | 5/1990 | Nimberger |
| 4,974,308 | A | 12/1990 | Nimberger |
| 5,248,167 | A | 9/1993 | Petrich et al. |
| 5,292,155 | A | 3/1994 | Bell et al. |
| 5,325,731 | A | 7/1994 | Miller et al. |
| 5,494,071 | A | 2/1996 | Bell et al. |
| 6,609,730 | B1 | 8/2003 | Hutton |
| 6,622,573 | B2 | 9/2003 | Kleven |
| 6,871,881 | B1 | 3/2005 | Hutton |
| 6,889,559 | B2 | 5/2005 | Gimson |
| 6,957,588 | B1 | 10/2005 | Kicher et al. |
| 7,047,822 | B2 | 5/2006 | Good et al. |
| 7,419,189 | B2 * | 9/2008 | Dickerson et al. ............ 285/219 |
| 7,458,614 | B2 * | 12/2008 | Hutton .......................... 285/219 |
| 7,562,907 | B2 * | 7/2009 | Hutton .......................... 285/219 |
| 2005/0151372 | A1 | 7/2005 | Hutton |

FOREIGN PATENT DOCUMENTS

| | | |
|---|---|---|
| JP | 57-020613 | 2/1982 |
| JP | 04-186122 | 7/1992 |
| WO | WO 2007/111844 A2 | 10/2007 |

OTHER PUBLICATIONS

Anderson Greenwood, Manifold and Isolation Value Mounting System for Direct Mounting DP Transmitters, 2004, 8 pages, Tyco Valves & Controls brochure, Stafford, Tex., USA.

Anderson Greenwood, The next generation of manifold systems, 2004, 8 pages, Tyco Valves & Controls brochure, Stafford, Tex, USA.

PGI International, Horizontal Direct-Mount System, Oct. 8, 2007, 1 page, PGI Industries advertisement, 16101 Vallen Drive, Houston, Tex. USA.

PGI International, Vertical Direct-Mount System, Oct. 8, 2007, 1 page, PGI International advertisement, 16101 Vallen Drive, Houston, Tex., USA.

* cited by examiner

FIG. 9

STABILIZED CONNECTOR

CROSS REFERENCE TO RELATED APPLICATION

This application claims the benefit of U.S. Provisional Application No. 61/067,338, filed Feb. 27, 2008, which is incorporated by reference.

BACKGROUND

This disclosure is related to taps for pipeline pressure sensing and, more particularly, to stabilized tap mounting assemblies.

The present disclosure is made in contemplation of the following references, which are incorporated into this Background section by reference: U.S. Patent Application Publication No. 2005/0151372; and U.S. Pat. Nos. 788,172; 1,201,746; 1,812,794; 2,238,169; 2,449,588; 2,465,495; 2,679,411; 3,362,731; 3,817,283; 4,129,149; 4,151,745; 4,193,420; 4,467,864; 4,582,089; 4,618,314; 4,672,728; 4,920,626; 4,974,308; 5,248,167; 5,292,155; 5,325,731; 5,494,071; 6,609,730; 6,622,573; 6,871,881; 6,889,559, 6,957,588; and 7,047,822.

SUMMARY

In an aspect, a mounting system for a tap may include a tap including a threaded portion sized to threadedly engage a hole in a mounting surface; a mounting plate carrying the tap and including a threaded press mechanism interposing a portion of the tap and the mounting surface, the threaded press mechanism being arranged to expand between the portion of the tap and the mounting surface, thereby pressing the tap in a direction away from the conduit; and at least one spring component interposing the portion of the tap and the threaded press mechanism, the spring component being arranged to bias apart the portion of the tap and the mounting plate. The spring component may be arranged to be compressed as the threaded press mechanism is expanded.

In a detailed embodiment, the mounting system may include a stop on one of the tap and the mounting plate, the stop being arranged to contact the other of the tap and the mounting plate upon at least one of (a) a predetermined amount of compression of the spring component and (b) a predetermined amount of expansion of the spring component.

In a detailed embodiment, the threaded press mechanism may include at least one jack screw extending through the mounting plate and towards the mounting surface. In a further detailed embodiment, the mounting plate may include at least one stepped-down portion and the at least one jack screw may extend through the stepped-down portion.

In a detailed embodiment, the mounting plate may include at least one angled end portion and the at least one jack screw may extend through the angled end portion.

In a detailed embodiment, the threaded press mechanism may include at least two jack screws extending through the mounting plate and towards the mounting surface and the at least two jack screws may be spaced apart from the tap. In a further detailed embodiment, the threaded press mechanism may include at least four jack screws.

In a detailed embodiment, the mounting plate may be substantially planar. In a detailed embodiment, the tap and the mounting plate may be slidably engaged.

In a detailed embodiment, the mounting system may include a base plate having an opening through which the tap extends, the base plate interposing the threaded press mechanism and the support surface. In a further detailed embodiment, at least a portion of the base plate extends beyond the support surface.

In a detailed embodiment, the spring component may include at least one Belleville washer. In a further detailed embodiment, the spring component may include two Belleville washers.

In an aspect, a tap mounting assembly may include a tap having a first end and a second end, the tap including a threaded portion proximate the first end, the threaded portion being sized to threadedly engage a threaded hole in a mounting surface, a central channel extending internally from the first end to the second end, and an external shoulder located between the first end and the second end; a mounting plate slidably engaged with the tap between the external shoulder and the first end; a spring component interposing the external shoulder and the mounting plate, the spring component being arranged to bias the mounting plate towards the first end.

In a detailed embodiment, at least one of the tap and the mounting plate may include a stop arranged to engage the other of the tap and the mounting plate upon predetermined compression of the spring component. In a further detailed embodiment, the stop may include a flange on the external shoulder and the stop may engage a contacting surface on the mounting plate upon predetermined compression of the spring component.

In a detailed embodiment, the spring component includes at least one Belleville washer. In a further detailed embodiment, the spring component may include two Belleville washers.

In an aspect, tap may include a first segment, the first segment including a first male-threaded end for engaging a threaded hole in a support surface, an opposing female-threaded end, a first passage extending between the first male threaded end and the female threaded end; a second segment, the second segment including a second male-threaded end couplable to the female threaded end of the first segment, an opposing flanged end, and a second passage extending between the second male threaded end and the flanged end; and a seal interposed between the first segment and the second segment to create a fluid sealed interface therebetween. The first passage and the second passage may provide a fluidic connection between the first male threaded end and the flanged end.

In a detailed embodiment, the tap may include a nut threaded onto the second male threaded end and tightenable against the first segment. In a detailed embodiment, the seal may include an o-ring.

In a detailed embodiment, the first segment may include an external shoulder arranged to oppose a mounting plate, the mounting plate being slidably engaged with the first segment between the first male threaded end and the external shoulder, and the external shoulder and the mounting plate may be interposed by a spring component. In a further detailed embodiment, at least one of the first segment and the mounting plate may include a stop arranged to engage the other of the first segment and the mounting plate upon predetermined compression of the spring component. In a further detailed embodiment, the spring component may include at least one Belleville washer. In a further detailed embodiment, the spring component may include two Belleville washers.

In a detailed embodiment, the mounting plate may include at least one jack screw arranged to press the mounting plate towards the external shoulder. In a detailed embodiment, the mounting plate may include a support base and a support collar, the support base engaging the spring component and the support collar engaging the support surface.

BRIEF DESCRIPTION OF THE DRAWINGS

The detailed description refers to the figures in which.

DETAILED DESCRIPTION

Exemplary manifold mounting systems may be used, for example, to mount one or more taps and/or other equipment to a pipe. For example, an exemplary embodiment may be used to attach two appropriate taps to a flange, the taps being used to support pressure sensing equipment in a cantilever fashion from the pipe flange. The pressure sensing equipment may include, for example, a valve manifold and a differential pressure detector used to sense a pressure drop across an orifice plate mounted between two connecting flanges in a pipeline for the purpose of measuring the flow rate through the pipeline. In particular, this type of flow measurement is commonly used in the natural gas industry, among others. Exemplary embodiments may also be used, for example, to attach one or more taps to a fitting in pipeline (such as, but not limited to, a Senior fitting, a Junior fitting, and/or a Simplex fitting) or to any container or conduit to which a tap may desirably be attached.

Figure 1:
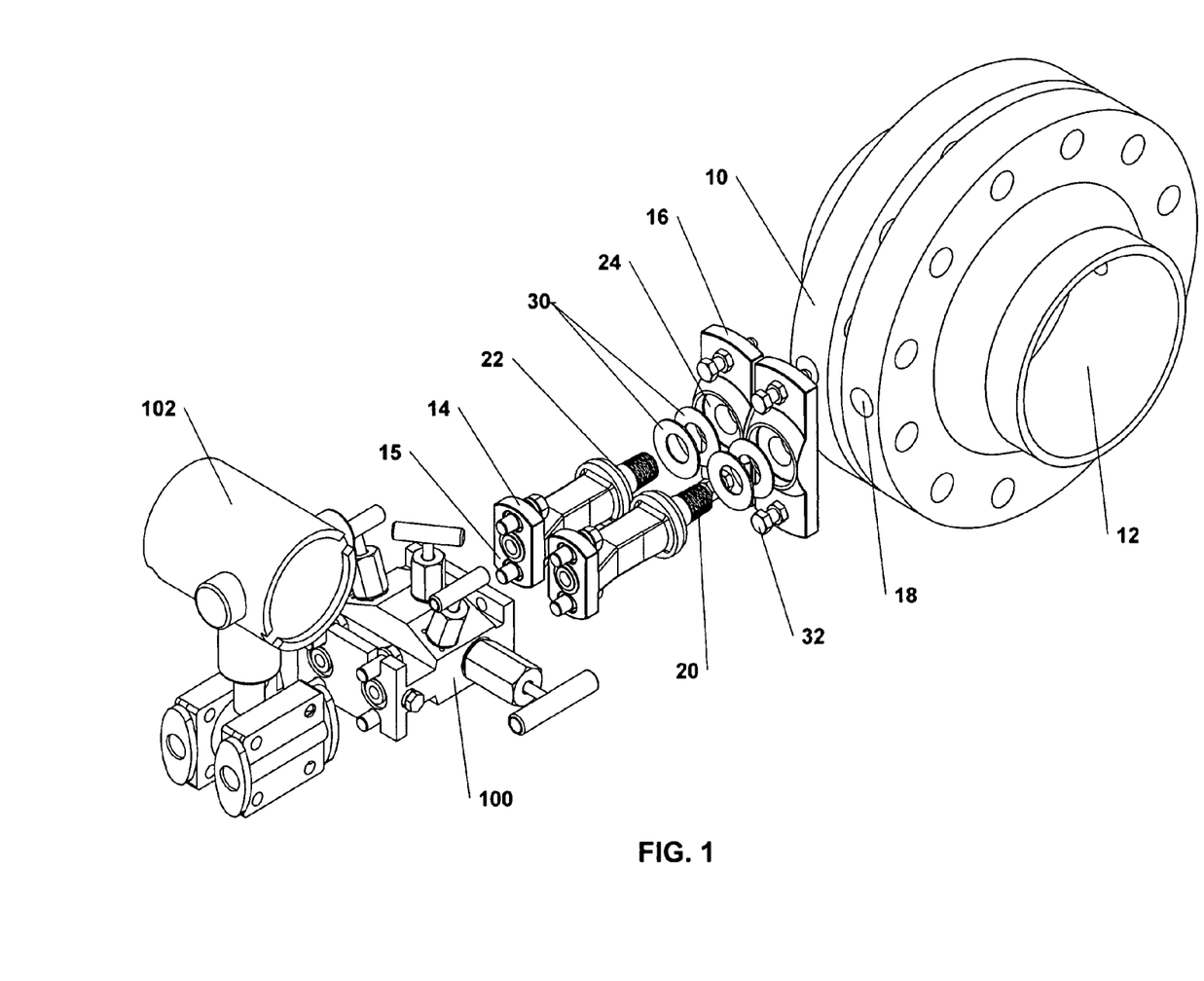
FIG. 1 is a perspective view of an exemplary manifold mounting system.

As shown in FIG. 1, an exemplary embodiment may comprise a manifold mounting system. The manifold mounting system may be used to support a valve manifold 100 and differential pressure detector 102 from a flange 10 in a pipeline 12. An exemplary manifold mounting system may include a tap 14 that extends through a mounting plate 16 and which may be threaded into a hole 18 in the flange 10. One end of the tap 14 may be provided with male NPT (National Pipe Thread Tapered) threads on a threaded portion 20, which may couple with corresponding female NPT threads in hole 18. The mounting plate may include one or more jack screws 32.

In some exemplary embodiments, the tap 14 may include an annular shoulder or the like (e.g., may be segmented), such as cylindrical portion 22 that fits within a corresponding opening, such as cylindrical opening 24 on the mounting plate 16, and shoulder 22 may be slidable within opening 24. An exemplary tap 14 may include a flanged end 15, which may be used to couple the tap 14 to other components, such as a valve manifold 100.

In an exemplary embodiment, one or more Belleville washers 30 may be interposed between the radially inward end (radially inward with respect to the flange 10) of the shoulder 22 of the tap 14 and the radially outward end of the opening 24 of the mounting plate 16. While some exemplary embodiments depicted herein include pairs of Belleville washers 30, it is within the scope of the disclosure to utilize any number of spring and/or biasing members of any suitable type. For example and without limitation, the pair of Belleville washers 30 may be replaced by one or more helical coil compression springs.

Figure 2:
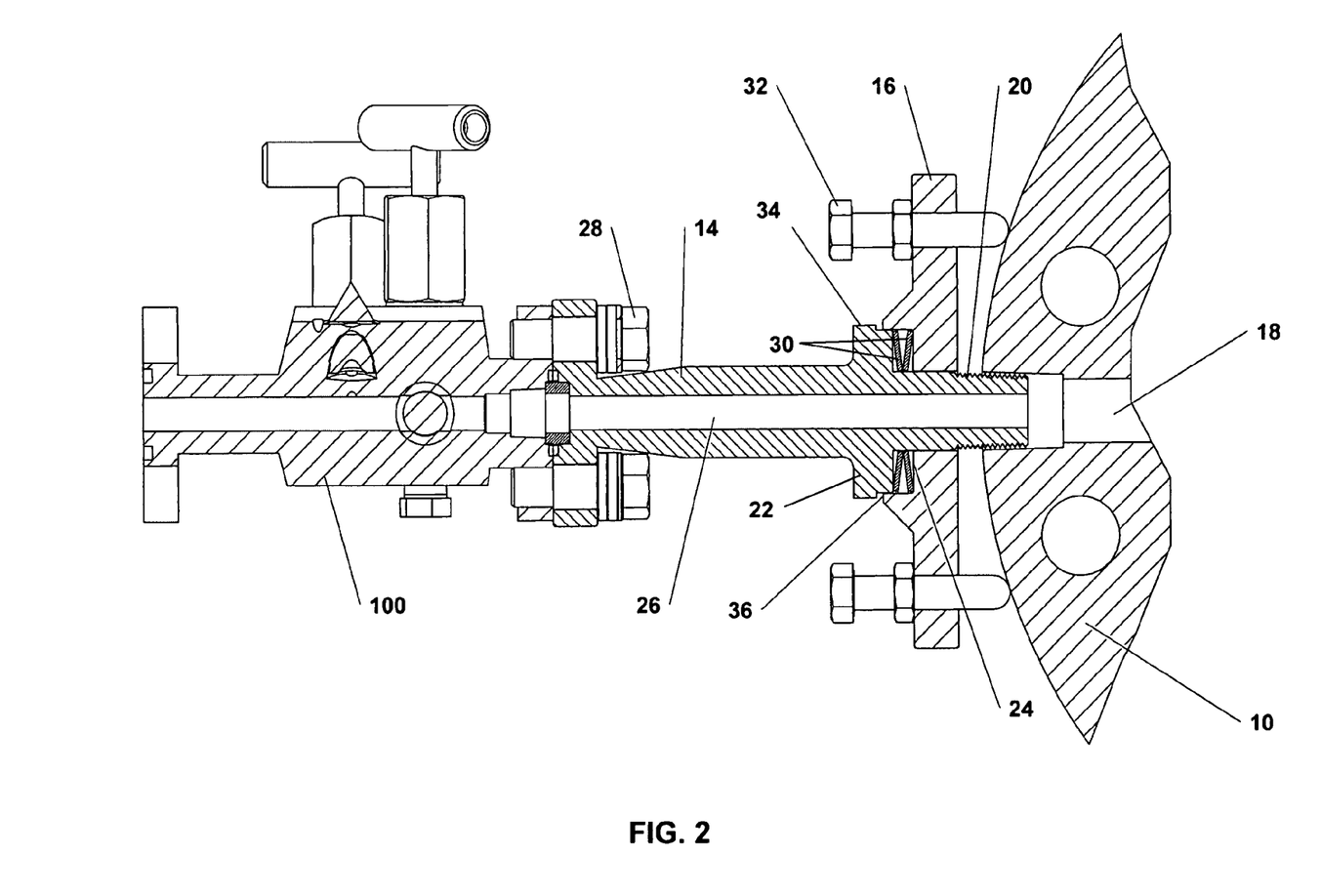
FIG. 2 is a cross sectional view of an exemplary stabilized connector assembly.

As shown in cross section in FIG. 2, an exemplary tap 14 may include a central channel 26 through which fluid may pass. One or more bolts 28 may be provided for attaching the flanged end 15 of the tap 14 to the valve manifold 100, for example.

In an exemplary embodiment, the pair of Belleville washers 30 may be oriented in opposite directions. The tap 14 may include an annular flange 34 or the like (e.g., may be segmented) extending from the radially outer end of the shoulder 22, and the mounting plate 16 may include a corresponding contact surface 36. The flange 34 may serve as a stop which may limit the compression of the spring member or members and which may indicate that the spring members have been compressed a predetermined distance. Exemplary embodiments may include other stops, such as tabs, nubs, etc. It is within the scope of the disclosure that such stops may also be positioned in other areas of the tap and/or mounting plate (or even on other components) as will be apparent to those of ordinary skill. In the exemplary embodiment of FIG. 2, the jack screws 32 may be aligned such that their axes are generally parallel with the axis of the tap 14.

Figure 3:
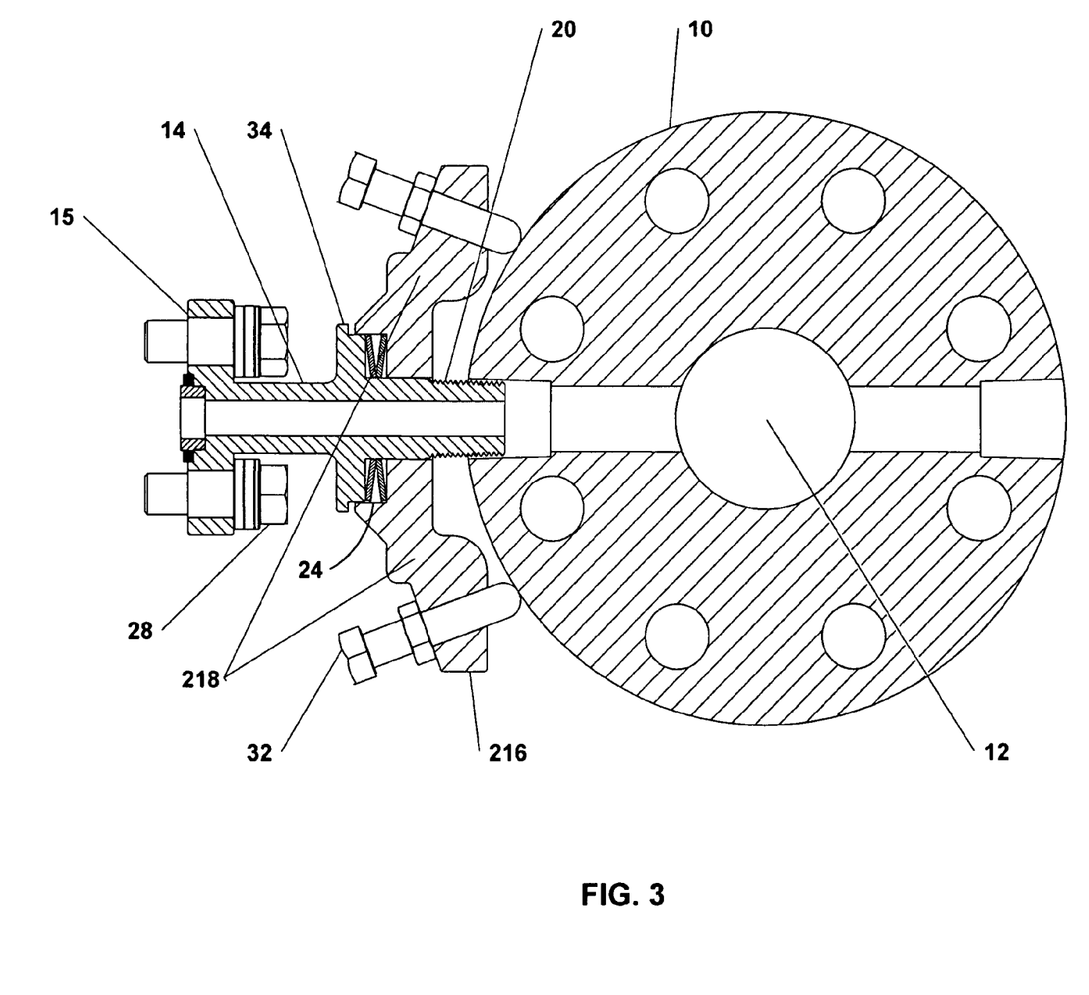
FIG. 3 is a cross sectional view of an exemplary stabilized connector assembly.

FIG. 3 depicts another exemplary embodiment including a mounting plate 216 having angled end portions 218 through which jack screws 32 extend. In this exemplary embodiment, the jack screws 32 are angled relative to the axis of the tap 14. The remaining components are generally similar to those described above.

Figure 4:
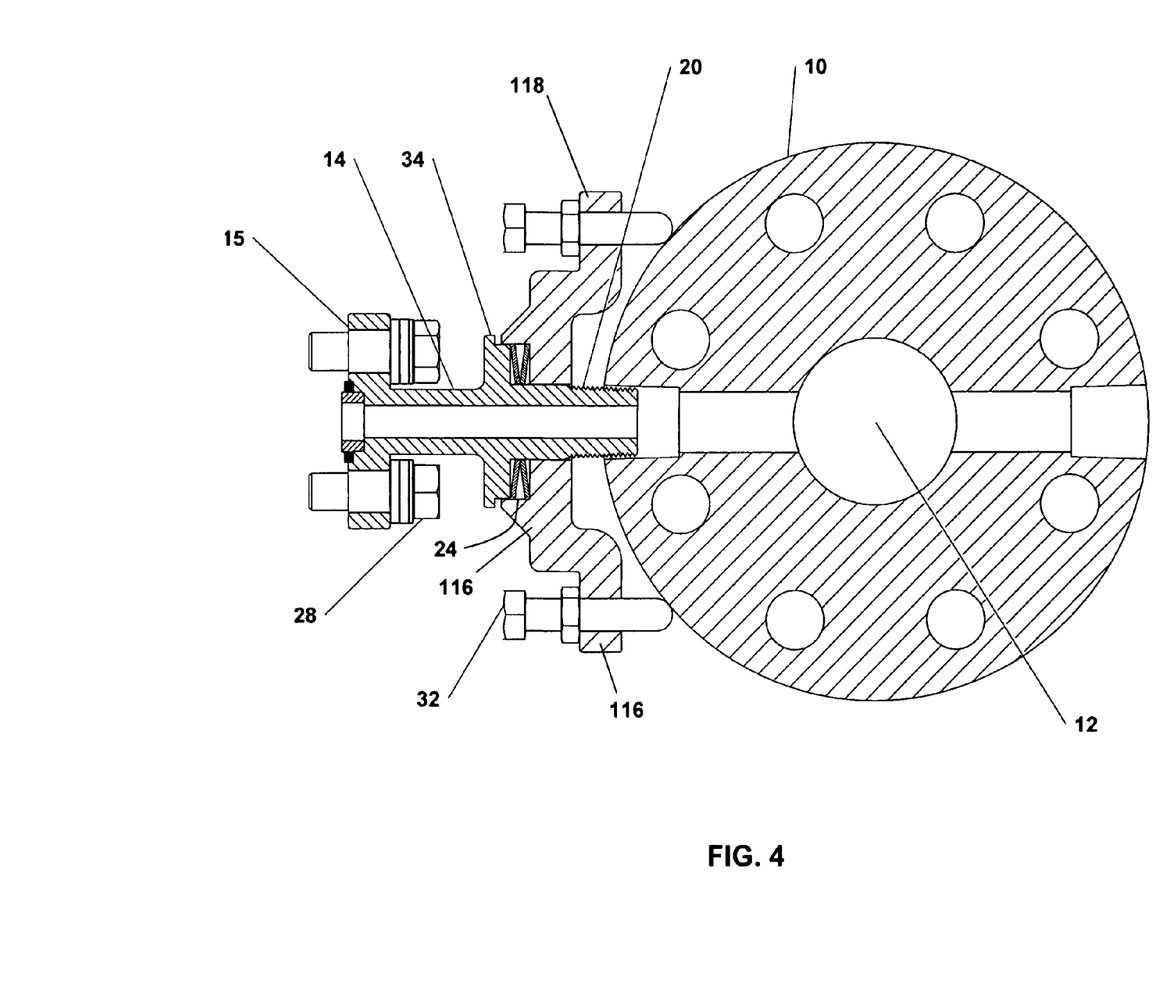
FIG. 4 is a cross sectional view of an exemplary stabilized connector assembly.

FIG. 4 is a simplified cross sectional view of another exemplary embodiment. All of the components are generally similar to and are numbered the same as those described above with the exception of the mounting plate 116, which includes stepped-down portions 118. In an exemplary embodiment, one or more of the jack screws 32 may extend through the stepped-down portions 118 of the mounting plate 116. In FIG. 4 the jack screws 32 are aligned such that their axes are generally parallel with the axis of the tap 14. Although the mounting plate 116 is depicted with right-angled corners providing stepped-down portions 118, other exemplary embodiments may include rounded or curved sections connecting to the stepped-down portions 118.

Exemplary embodiments may include jack screws 32 that are oriented generally parallel with the axis of the tap (as shown in FIGS. 1, 2, 4, for example) and/or may include jack screws 32 that are angled with respect to the axis of the tap (as shown in FIG. 3, for example). Exemplary embodiments may include mounting plates 16, 116, 216 having one or more openings 24. For example and without limitation, an exemplary mounting plate may include two openings 24 such that one mounting plate provides support for two taps 14.

Exemplary embodiments may be utilized in any application where a device functioning as tap is joined to a container or conduit. For example and without limitation, exemplary embodiments may be used to support a tap on a pipe at a location other than on a flange. Further, for example, exemplary embodiments may be used to support a tap on a on a tank or other vessel. In addition, exemplary embodiments may be used for any application requiring a device functioning as a tap as known to those of skill in the art. For example and without limitation, exemplary embodiments may be used for pressure or other sensing and/or withdrawing or injecting material from or into the container or conduit.

Exemplary embodiments may be constructed of materials known to those of skill in the art to be appropriate for contact with the substances contained within the containers or conduits. For example, exemplary embodiments of the invention may be constructed of steels (such as stainless steels), aluminum, and/or other metals.

An exemplary embodiment of the invention may be installed as follows. The Belleville washers 30 may be placed over the threaded portion 20 of the tap 14. The threaded portion 20 may be inserted through the cylindrical opening 24 of the mounting plate 16. The threaded portion 20 of the tap 14 may be threaded into the hole 18 in the flange 10. The jacks screws 32 may be turned so as to push the mounting plate 16 away from the flange 10, thereby compressing the Belleville washers 30. The jack screws 32 may be tightened until the shoulder 34 of the tap 14 just touches the contact surface 36 of the mounting plate. Bolts 28 may be used to attach other components to the flanged end 15 of the tap.

Figure 5:
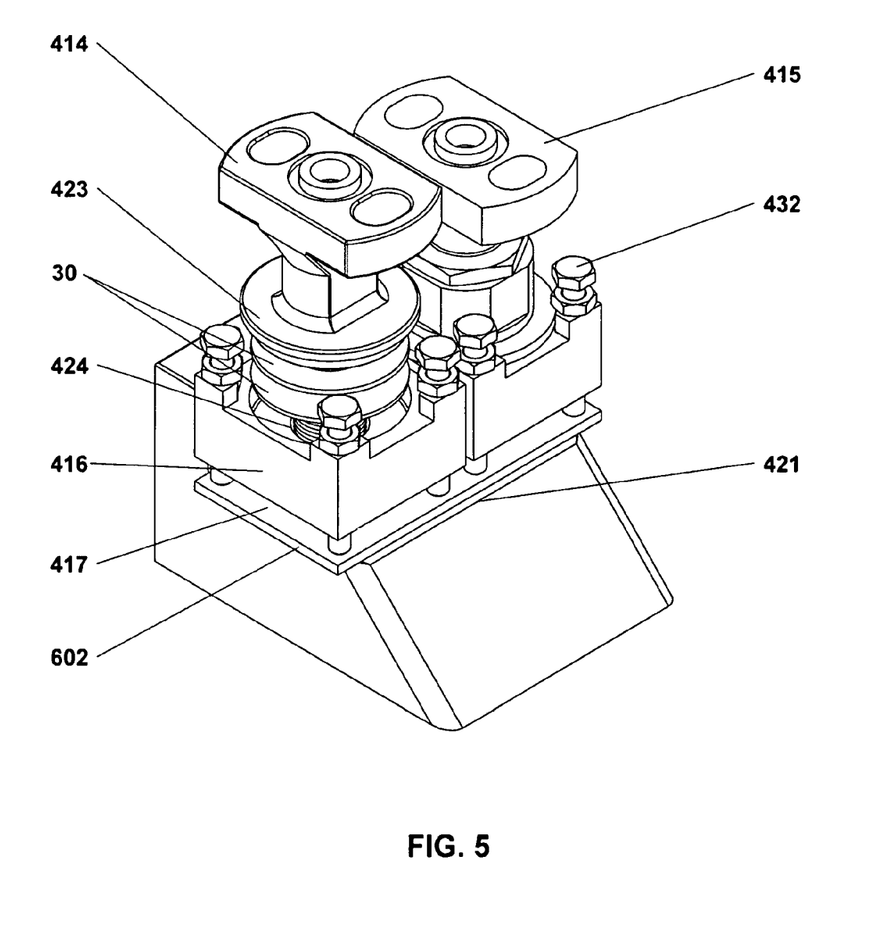
FIG. 5 is a perspective view of an exemplary mounting system.

FIG. 5 depicts another exemplary mounting system which may be used to mount a tap 414 on a device having a relatively small support surface 421. Mounting plate 416 may be constructed generally similarly to the mounting plates described above, with an opening 424 for accepting a portion of tap 414. One or more Belleville washers 30 (or other suitable biasing members) may be interposed between tap 414 and mounting plate 416 as described above, and tap 414 may include a shoulder 423 that operates as described above. Mounting plate 416 may include one or more jack screws 432 arranged to press mounting plate 416 away from mounting surface 421 and create a space 417 therebetween. In some exemplary embodiments, jack screws 432 may be smaller than the jack screws 32 described above for flange mounting applications. Further, jack screws 432 may include socket or hex heads and may also include lock nuts. It is within the scope of the invention to utilize a mounting plate 416 having more than one cylindrical opening 424 for accepting more than one tap 414. FIG. 5 also depicts an exemplary embodiment of two piece tap-connector assembly 415 and base plate 602, which are discussed in detail below with regard to FIG. 7.

The exemplary embodiment shown in FIG. 5 may be installed as follows. Tap 414 may be inserted through one or more Belleville washers and mounting plate 416. Tap 414 may be threaded into a hole in support surface 421. Jack screws 432 may be turned to press mounting plate 416 away from support surface 421 and against tap 414, thereby compressing the Belleville washers. Tightening may cease when shoulder 423 contacts mounting plate 416.

Figure 6:
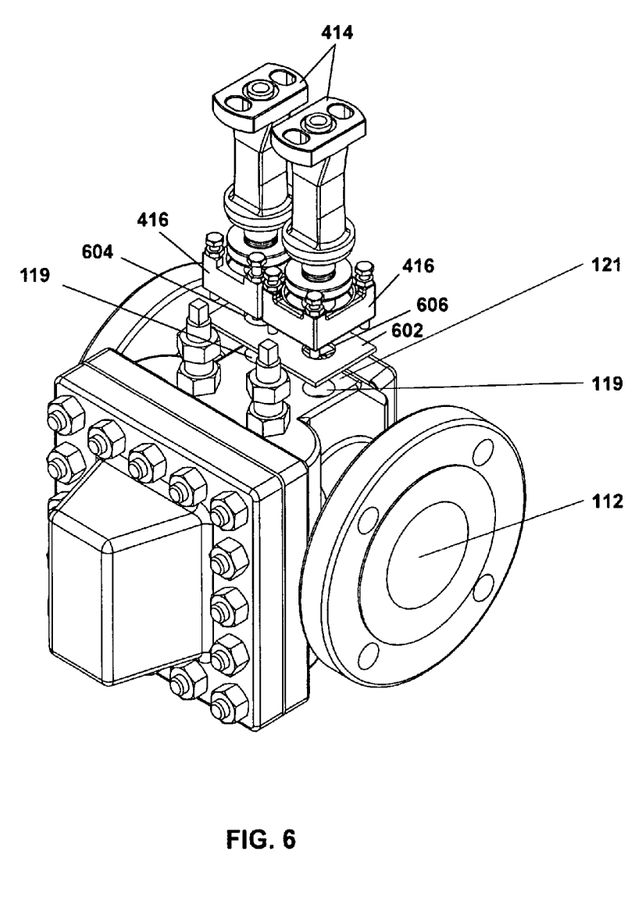
FIG. 6 is a perspective view of an exemplary mounting system.

FIG. 6 is an exploded view showing two taps 414, two mounting plates 416, and base plate 602 arranged for assembly with holes 119 and surface 121 of a device that permits an orifice fitting to be removed and installed in a pipeline 112 without depressurizing the pipeline 112. Such a device may include a relatively small surface 121 on which a tap stabilizing device may be mounted. Also, such a device may necessitate mounting a plurality of taps 414 in close proximity to each other.

Figure 7:
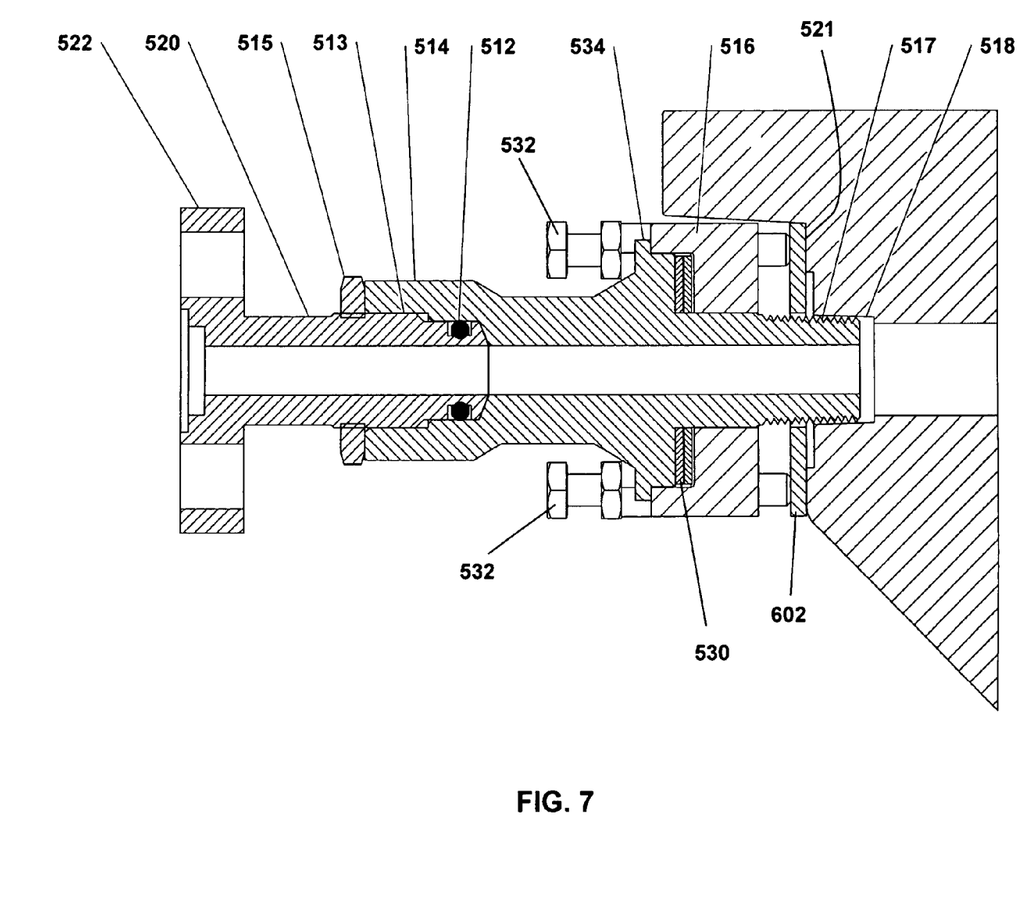
FIG. 7 is a cross sectional view of an exemplary two-segment tap.

FIG. 7 is a cross-sectional view of another alternative exemplary embodiment including a two piece tap assembly. First segment 514 may include a threaded end 517 which may be threaded into a hole 518 (such as, but not limited to, a ½" NPT threaded hole) in mounting surface 521. Bracket 516 may at least partially surround a portion of the first segment 514 and may operate to transfer loads to the mounting surface 521. Exemplary embodiments may include one or more Belleville washers 530 and a shoulder having a flange 534, which may operate as described above. Second segment 520 may be a separate piece and may include a threaded interface 513 with first segment 514 and a flanged end 522.

In the exemplary embodiment shown in FIG. 7, first segment 514 includes female threads in the threaded interface 513 and second segment 520 includes corresponding male threads in the threaded interface 513. The threaded interface 513 may include threads having a smaller pitch than the NPT threaded end (28-32 threads per inch, for example). O-ring 512 (or any other suitable sealing device as is known in the art, such as a washer, gasket, etc.) may provide a sealed connection between first segment 514 and second segment 520. Lock nut 515 may be threaded onto connector 520 and against first segment 514.

The exemplary embodiment shown in FIG. 7 may be assembled as follows. The first segment 514 may be inserted through the Belleville washers 530 and the cylindrical bracket 516. The threaded end 517 may be threaded into hole 518. The lock nut 515 and o-ring 512 may be installed on second segment 520 and second segment 520 may be threaded into first segment 514. When the desired orientation of flanged end 522 on second segment 520 has been achieved, lock nut 515 may be tightened against first segment 514.

Exemplary embodiments of a two piece tap assembly may be incorporated in other mounting systems. For example, exemplary embodiments of the two piece tap assemblies may be utilized in place of conventional taps, including those not incorporating mounting plates or cylindrical brackets. Further, two piece tap assemblies may be utilized in place of the taps of any of the embodiments described herein.

Some embodiments may include a base plate 602, an exemplary embodiment of which is depicted in FIGS. 5, 6, and 7. Base plate 602 may include one or more tap openings 604, 606, through which one or more taps may extend. Exemplary embodiments of the base plate may be of a size larger than a mounting surface to which one or more taps are coupled, though embodiments of base plate may be used on any size or shape of mounting surface. Further, it is within the scope of the disclosure to utilize base plates having various shapes, such as generally rectangular, generally circular, as well as any other appropriate shape. Further, it is within the scope of the disclosure to utilize a base plate having other than a flat, uniform cross section. For example, a base plate may have a curved cross section and/or a thickness that varies across a cross section. In exemplary embodiments, the base plate may be constructed of any material having sufficient rigidity (such as, for example, steel).

Exemplary embodiments of base plate 602 may be used with any of the exemplary embodiments described herein, as well as with any mounting system in which such a base plate would be advantageous. Referring to FIG. 7, for example, jack screws 532 may extend from mounting plate 516 to the base plate 602, and the base plate 602 may be positioned against the mounting surface 521. The base plate 602 may serve to transfer forces from the jack screws 532 to the mounting surface 521, thus reducing the loads felt by the NPT threaded end 517 of the tap 514, which is threaded into the hole 518 in the mounting surface 521.

In the exemplary embodiment depicted in FIG. 5, each mounting plate 416 includes four jack screws 432; however, it is within the scope of the disclosure to utilize mounting plates 416 having more or fewer jack screws 432. Also, as shown in FIG. 5, it is within the scope of the disclosure for the base plate 602 to extend beyond the mounting surface 421 such that a portion of the base plate 602 is cantilevered. In some exemplary embodiments, utilizing a base plate that is wider than the mounting surface may allow greater separation between the jack screws, thus allowing the mounting system to support larger cantilever loads, such as the valve manifold and differential pressure detector mentioned above.

Figure 8:
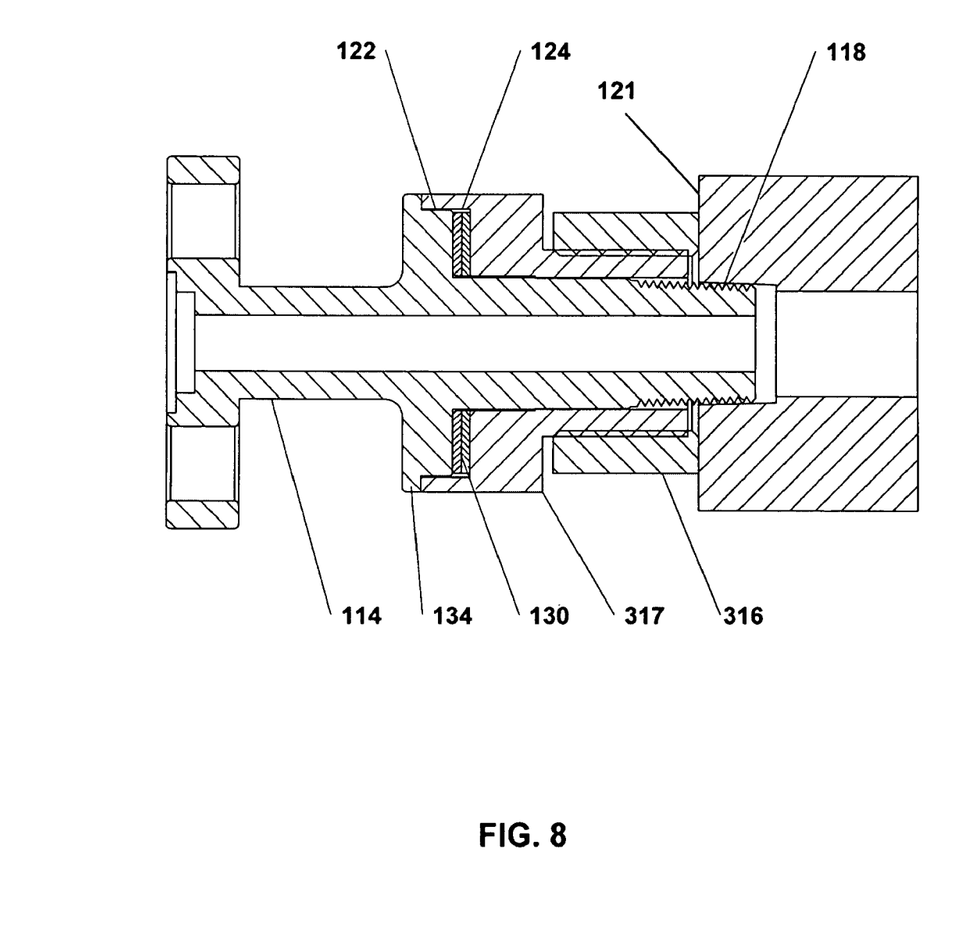
FIG. 8 is a cross sectional view of an exemplary stabilized connector assembly including a support collar and a support base.

FIG. 8 depicts another alternative exemplary embodiment. This exemplary embodiment includes many of the features of the exemplary embodiments described above with the notable difference that its mounting plate may include a support base 316 and/or a support collar 317. Tap 114, similar to tap 14, may be threaded into hole 118, which may be surrounded by a support surface 121 that may be contacted by one or more parts of a mounting system. Threaded hole 118 may be connected to one side of an orifice fitting as described above, for example.

In an exemplary embodiment, tap 114 may be supported by support base 316. Support base 316 may be generally in the shape of a hollow cylinder. The interior may be threaded and the exterior may be shaped to receive a tool, such as a wrench. For example, the exterior of the support base 316 may have a hexagonal shape. It is within the scope of the disclosure to utilize a support base 316 having a different shape or surface features, such as one or more pairs of opposed flat surfaces. The support base 316 may contact support surface 121.

An exemplary support collar 317 may be sized to fit over tap 114 and within support base 316. Support collar 317 may generally be in the shape of a hollow cylinder and may have a non-threaded interior surface and/or a threaded exterior surface. In the exemplary embodiment shown in FIG. 8, the exterior surface of support collar 317 includes threads that engage with threads on the interior surface of support base 317. Support collar 317 may include a feature (for example and without limitation, one or more tabs, slots, and/or projections) located to engage a corresponding feature on tap 114 to prevent rotation of support collar 317 in relation to tap 114.

Further, an exemplary support collar 317 may include a cylindrical opening 124 sized to slidably receive a cylindrical portion 122 of tap 114 in manner similar to that described above. Belleville washers 130 (and/or one or more other spring or biasing devices) may be interposed between portions of support collar 317 and tap 114 such that support collar 317 and tap 114 are biased apart. Notably, the exemplary embodiment depicted in FIG. 8 includes Belleville washers 130 oriented opposite of the Belleville washers 30 described above. It is within the scope of the disclosure to include any suitable spring and/or biasing device in any suitable orientation in any embodiment. Further, it is within the scope of the disclosure to utilize slidably engaged portions having shapes other than cylindrical.

The exemplary embodiment shown in FIG. 8 may be installed as follows. Support collar 317 and support base 316 may be assembled onto tap 114. Tap 114 may be threaded into hole 118. Support base 316 may be turned relative to support collar 317 to increase the total combined length of support base 316 and support collar 317, thereby compressing Belleville washers 130. Notably, the support collar 317 may be pressed in a direction generally from the threaded end of the tap 114 towards the flanged end of the tap 114. When Belleville washers 130 are compressed to the extent that shoulder 134 contacts support collar 317, the tightening may be stopped. The support base 316 and support collar 317 may be threaded together prior to assembly onto tap 114.

Figure 9:
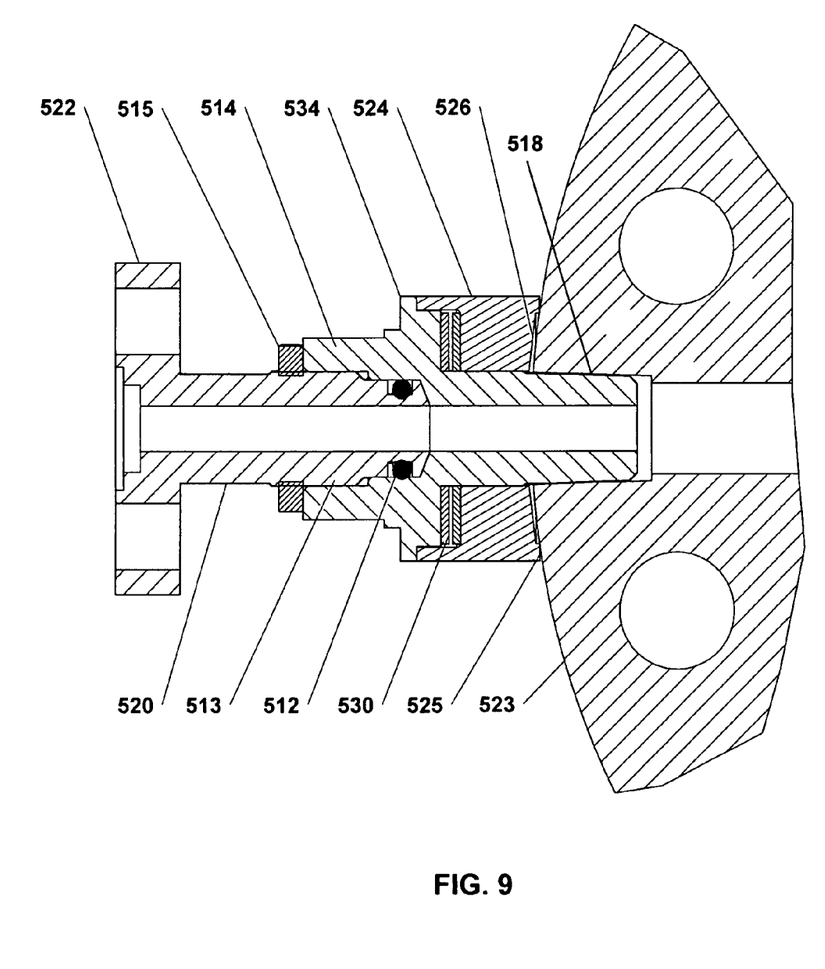
FIG. 9 is a cross sectional view of an exemplary stabilized connector assembly on a round support surface.

FIG. 9 depicts an exemplary embodiment of a two piece tap-connector assembly (similar to that depicted in FIG. 7) assembled with a flange including a curved mounting surface 523. This exemplary embodiment is generally similar to the exemplary embodiment depicted in FIG. 7; however, its mounting plate includes bracket 524, which may include a curved surface 526 and/or one or more surface features 525 for engaging curved mounting surface 523. It is within the scope of the disclosure to include similar features on any embodiment described herein.

Notably, in the exemplary embodiment shown in FIG. 9, the Belleville washers 530 are compressed as the tap 514 is threaded into the flange, and this exemplary bracket 524 does not utilize jack screws. Once the tap 514 has been tightened relative to the flange, the angular orientation of the flange 522 of the connector may be adjusted as desired, then the lock nut 515 may be tightened against the tap 514. As with the embodiment depicted in FIG. 7, the two-piece tap-connector assembly permits adjustment of the angular orientation of the flange without disturbing the tapered thread engagement with the hole in the flange In general, exemplary mounting plates may include one or more jack screws (or other equivalent devices) and one or more openings sized to receive a corresponding portion of a tap. In some embodiments, the jack screws may be oriented generally parallel to the axis of the tap. In other exemplary embodiments, the jack screws may be provided in a non-parallel arrangement. Also, in some exemplary embodiments, the mounting plate may include one or more stepped-down portions which may be located generally near the ends of the mounting plate. In some exemplary embodiments, the jack screws may extend through the stepped-down portions towards the pipeline. In some exemplary embodiments, the holes in the mounting plate through which the jack screws extend may be threaded to correspond with threads on the jack screws. Further, in some exemplary embodiments, the jack screws may include a lock nut which may be tightened against, for example, the mounting plate.

In some exemplary embodiments, the cylindrical opening and the corresponding cylindrical portion of the tap may be without threads, and the fit may be such that the tap is axially slidable relative to the mounting plate. The fit may be sufficiently close, however, so that the mounting plate provides structural support for the tap. The cylindrical portion of the tap may be separated from the end of the cylindrical opening in the mounting plate by one or more spring members (for example, and without limitation, two Belleville washers oriented in opposite directions). The spring members may bias the cylindrical portion of the tap away from the end of the cylindrical opening of the mounting plate.

To install an exemplary device, the sliding cylindrical portion of the tap and the Belleville washers may be inserted into the cylindrical opening of the mounting plate. The leading end of tap (extending through the mounting plate) may then be threaded into a threaded port of a radial channel extending through the connecting flange in the pipeline. The jack screws may be tightened against the flange, causing the mounting plate to move away (radially outward) from the connecting flange. This may cause the mounting plate to compress the Belleville washers against the cylindrical portion of the tap. The jack screws may be tightened until the shoulder on the tap is in contact with the mounting plate.

Exemplary embodiments may provide the ability to predict the loads on the components due to tightening the jack screws. The Belleville washers (or other springs or biasing members) may have known characteristics and the shoulder on the tap (or other similar device) may provide a known displacement. Thus, the forces on the components of the mounting system due to tightening the jack screws may be calculated in advance because a known spring member is compressed a known distance. Because it may be readily apparent to an installer that he or she has properly tightened the jack screws when the shoulder of the tap is in contact with the mounting plate, these features may also promote proper installation of the device by providing a visual indication that proper initial loading has been achieved. Notably, this visual indication of proper tightening may obviate the need to use a torque wrench in some applications.

The present disclosure contemplates that utilizing the Belleville washers (or other spring or biasing members) to bias apart a mounting plate and a tap may provide additional advantages. For example, if one or more of the jack screws becomes loose after installation, the Belleville washers may continue to bias the mounting plate against the flange; thus, the tap may remain supported by the mounting plate. Without the Belleville washers, the mounting plate may become loose relative to the flange if one of the jack screws becomes loose, which may excessively load the threaded portion of the tap, particularly if heavy equipment is supported by the tap or the system is subject to cyclic loading or vibration.

While several of the figures depict a pair of taps, the taps connecting to opposite sides of an orifice flange, exemplary embodiments are described herein with reference to a single tap. It is to be understood that exemplary embodiments may include one or more taps.

While exemplary embodiments have been set forth above for the purpose of disclosure, modifications of the disclosed embodiments of the invention as well as other embodiments thereof may occur to those skilled in the art. Accordingly, it is to be understood that the inventions contained herein are not limited to the above precise embodiments and that changes may be made without departing from the scope of the invention as defined by the claims. Likewise, it is to be understood that the invention is defined by the claims and it is not necessary to meet any or all of the stated advantages or objects of the invention disclosed herein to fall within the scope of the claims, since inherent and/or unforeseen advantages of the present invention may exist even though they may not have been explicitly discussed herein.

The invention claimed is:

1. A mounting system for a tap comprising:
a tap including a threaded portion sized to threadedly engage a hole in a mounting surface;
a mounting plate carrying the tap and including a threaded press mechanism interposing a portion of the tap and the mounting surface, the threaded press mechanism being arranged to expand between the portion of the tap and the mounting surface, thereby pressing the tap in a direction away from the conduit; and
at least one spring component interposing the portion of the tap and the threaded press mechanism, the spring component being arranged to bias apart the portion of the tap and the mounting plate;
wherein the spring component is arranged to be compressed as the threaded press mechanism is expanded.

2. The mounting system of claim 1, further comprising a stop on one of the tap and the mounting plate, the stop being arranged to contact the other of the tap and the mounting plate upon at least one of (a) a predetermined amount of compression of the spring component and (b) a predetermined amount of expansion of the spring component.

3. The mounting system of claim 1, wherein the threaded press mechanism includes at least one jack screw extending through the mounting plate and towards the mounting surface.

4. The mounting system of claim 3, wherein
the mounting plate includes at least one stepped-down portion; and
wherein the at least one jack screw extends through the stepped-down portion.

5. The mounting system of claim 1, wherein
the mounting plate includes at least one angled end portion; and
wherein the at least one jack screw extends through the angled end portion.

6. The mounting system of claim 1, wherein
the threaded press mechanism includes at least two jack screws extending through the mounting plate and towards the mounting surface; and
wherein the at least two jack screws are spaced apart from the tap.

7. The mounting system of claim 6, wherein the threaded press mechanism includes at least four jack screws.

8. The mounting system or claim 1, wherein the mounting plate is substantially planar.

9. The mounting system of claim 1, wherein the tap and the mounting plate are slidably engaged.

10. The mounting system of claim 1, further comprising a base plate having an opening through which the tap extends, the base plate interposing the threaded press mechanism and a support surface.

11. The mounting system of claim 10, wherein at least a portion of the base plate extends beyond the support surface.

12. The mounting system of claim 1, wherein the spring component includes at least one Belleville washer.

13. The tap of claim 12, wherein the spring component includes two Belleville washers.

14. A tap mounting assembly comprising:
a tap having a first end and a second end, the tap including
a threaded portion proximate the first end, the threaded portion being sized to threadedly engage a threaded hole in a mounting surface,
a central channel extending internally from the first end to the second end, and
an external shoulder located between the first end and the second end;
a mounting plate slidably engaged with the tap between the external shoulder and the first end;
a spring component interposing the external shoulder and the mounting plate, the spring component being arranged to bias the mounting plate towards the first end.

15. The tap mounting assembly of claim 14, wherein at least one of the tap and the mounting plate includes a stop arranged to engage the other of the tap and the mounting plate upon predetermined compression of the spring component.

16. The tap mounting assembly of claim 15,
wherein the stop includes a flange on the external shoulder; and
wherein the stop engages a contacting surface on the mounting plate upon predetermined compression of the spring component.

17. The tap mounting assembly of claim 14, wherein the spring component includes at least one Belleville washer.

18. The tap mounting assembly of claim 17, wherein the spring component includes two Belleville washers.

19. A tap comprising:
a first segment, the first segment including
a first male-threaded end for engaging a threaded hole in a support surface,
an opposing female-threaded end,
a first passage extending between the first male threaded end and the female threaded end;
a second segment, the second segment including
a second male-threaded end couplable to the female threaded end of the first segment,
an opposing flanged end, and a second passage extending between the second male threaded end and the flanged end; and a seal interposed between the first segment and the second segment to create a fluid sealed interface therebetween;

wherein the first passage and the second passage provide a fluidic connection between the first male threaded end and the flanged end; and wherein the opposing flanged end includes a plurality of flange orifices.

20. The tap of claim 19, further comprising a nut threaded onto the second male threaded end and tightenable against the first segment.

21. The tap of claim 19, wherein the seal includes an o-ring.

22. A tap comprising:

a first segment, the first segment including
  a first male-threaded end for engaging a threaded hole in a support surface,
  an opposing female-threaded end,
  a first passage extending between the first male threaded end and the female threaded end;

a second segment, the second segment including
  a second male-threaded end couplable to the female threaded end of the first segment,
  an opposing flanged end, and
  a second passage extending between the second male threaded end and the flanged end; and a seal interposed between the first segment and the second segment to create a fluid sealed interface therebetween;

wherein the first passage and the second passage provide a fluidic connection between the first male threaded end and the flanged end;

wherein the first segment includes an external shoulder arranged to oppose a mounting plate, the mounting plate being slidably engaged with the first segment between the first male threaded end and the external shoulder; and wherein the external shoulder and the mounting plate are interposed by a spring component.

23. The tap of claim 22, wherein at least one of the first segment and the mounting plate includes a stop arranged to engage the other of the first segment and the mounting plate upon predetermined compression of the spring component.

24. The tap of claim 23, wherein the spring component includes at least one Belleville washer.

25. The tap of claim 24, wherein the spring component includes two Belleville washers.

26. The tap of claim 22, wherein the mounting plate includes at least one jack screw arranged to press the mounting plate towards the external shoulder.

27. The tap of claim 22, wherein the mounting plate includes a support base and a support collar, the support base engaging the spring component and the support collar engaging the support surface.

* * * * *